(12) United States Patent
Tsuya et al.

(10) Patent No.: US 7,360,964 B2
(45) Date of Patent: Apr. 22, 2008

(54) JOINT STRUCTURE

(75) Inventors: Hideki Tsuya, Okazaki (JP); Naoki Hirose, Toyota (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/930,902

(22) Filed: Sep. 1, 2004

(65) Prior Publication Data

US 2005/0054229 A1 Mar. 10, 2005

(30) Foreign Application Priority Data

Sep. 5, 2003 (JP) .............. 2003-314073
Aug. 18, 2004 (JP) .............. 2004-238571

(51) Int. Cl.
*F16B 11/00* (2006.01)

(52) U.S. Cl. ............... 403/280; 403/277; 403/274; 24/292

(58) Field of Classification Search ........... 403/326, 403/329, 397, DIG. 14, 274, 276, 277, 280, 403/281; 24/453, 458, 297, 292, 581.1, DIG. 51
See application file for complete search history.

(56) References Cited

U.S. PATENT DOCUMENTS

| | | | |
|---|---|---|---|
| 3,485,133 A | 12/1969 | Rapata | |
| 4,004,734 A * | 1/1977 | Hadtke | .......... 239/58 |
| 4,212,415 A * | 7/1980 | Neely | .......... 222/231 |
| 4,568,215 A | 2/1986 | Nelson | |
| 4,576,532 A | 3/1986 | Hanson et al. | |
| 4,729,606 A * | 3/1988 | Narita et al. | .......... 301/37.371 |
| 5,314,669 A * | 5/1994 | Hamilton | .......... 422/305 |
| 5,367,751 A * | 11/1994 | DeWitt | .......... 24/295 |
| 5,533,237 A * | 7/1996 | Higgins | .......... 24/289 |
| 5,699,601 A * | 12/1997 | Gilliam et al. | .......... 29/278 |
| 6,111,760 A * | 8/2000 | Nixon | .......... 361/814 |
| 6,608,766 B2 * | 8/2003 | Wortman et al. | .......... 361/818 |

FOREIGN PATENT DOCUMENTS

| | | | |
|---|---|---|---|
| DE | 24 56 505 | | 6/1976 |
| EP | 0 736 694 | | 10/1996 |
| FR | 2 536 128 | | 5/1984 |
| GB | 2088013 | * | 11/1980 |
| JP | 11-240388 | | 9/1999 |
| NL | 0404240 | * | 6/1990 |
| WO | WO02070905 | * | 9/2002 |

* cited by examiner

*Primary Examiner*—Daniel P. Stodola
*Assistant Examiner*—Daniel J. Mills
(74) *Attorney, Agent, or Firm*—Wenderoth, Lind & Ponack, L.L.P.

(57) ABSTRACT

A joint structure is for joining a pair of connecting members to each other. One of the connecting members has a lock portion formed so as to protrude from the member, and the other connecting member is provided with a receiving portion into which the lock portion is insertable. The lock portion is inserted into the receiving portion while at least one of the lock and receiving portions is being resiliently flexed. Thereafter, the lock or receiving portion is restored to its initial shape. As a result, the lock and receiving portions are joined to each other. The lock and receiving portions are abutted against each other such that at least one of the lock and receiving portions deforms the other into engagement with one another. As a result, this deformation limits relative movement between the lock and receiving portions.

8 Claims, 15 Drawing Sheets

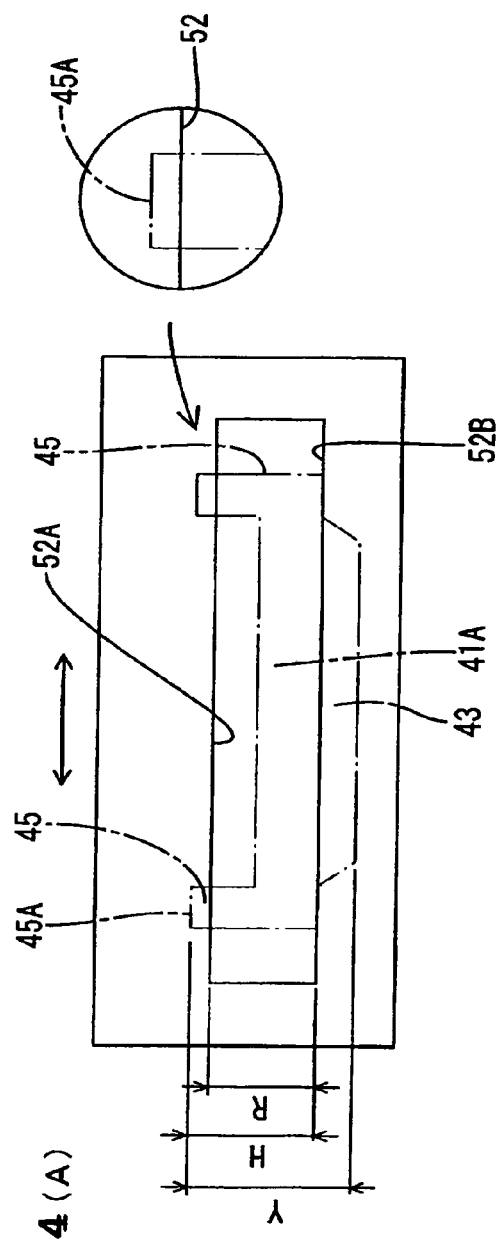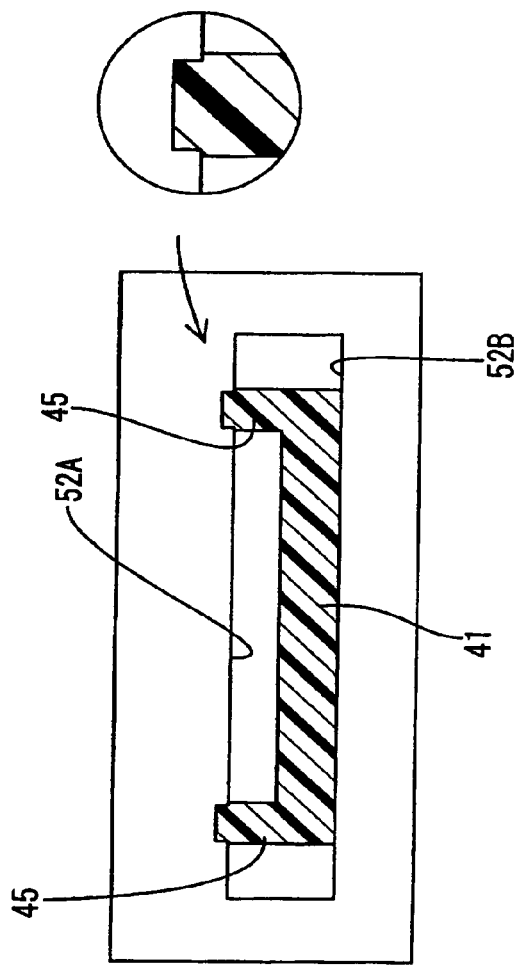
Fig. 4(A)
Fig. 4(B)

JOINT STRUCTURE

BACKGROUND OF THE INVENTION

1. Field of the Invention

This invention relates to a joint structure for joining a pair of connecting members to each other.

2. Description of the Related Art

As a joint structure for joining a pair of connecting members to each other, a type in which a hooked claw is engaged with another member is well known. For example, JP-A-11-255034 discloses such a type. This disclosed structure (as seen in FIGS. 15(A) and 15(B)) includes a hooked lock claw 2 provided on a side of synthetic resin door trim 1, and a locking member 6 provided on a distal end at an opening side of a door pocket 5, also made from a synthetic resin. The lock claw 2 of the door trim 1 is insertable into the locking member 6. Accordingly, when the lock claw 2 on the door trim 1 side is inserted into the locking member 6 of the door pocket 5, the lock claw 2 is engaged with the locking member 6. Thereby, the door pocket 5 is held in such a way as to be prevented from falling.

In the foregoing structure, vibration or shaking (in a direction of arrows in FIG. 15(A), for example) of the door pocket 5 against the door trim 1 cannot be sufficiently restricted even though the door pocket 5 is secured against falling or other types of inadvertent removal. Furthermore, it has been suggested to design an outer width of the lock claw 2 to be substantially equal to an inner width of the locking member 6. In such a case however, variations due to manufacturing parameters in a width of the lock claw 2 or locking member 6 cannot be absolutely avoided at a reasonable cost, so that a gap is inevitably set between both members. As a result, the gap allows shaking or vibration of these mating parts.

SUMMARY OF THE INVENTION

Therefore, an object of the present invention is to provide a joint structure which can join connecting members to each other and inhibit shaking of the connecting members.

To achieve the object, the present invention provides a joint structure for joining a pair of connecting members to each other. One of the connecting members has a lock portion formed so as to protrude therefrom, and the other connecting member is provided with a receiving portion into which the lock portion is insertable. The lock and receiving portions are initially abutted against each other. The lock portion is inserted into the receiving portion while at least one of the lock and receiving portions is flexed or resiliently bent. Thereafter, the lock or receiving portion is restored to its initial shape, whereupon the lock and receiving portions are joined to each other. In addition, the lock and receiving portions are abutted against each other such that at least one of the lock and receiving portions is deformed by the other into engagement with one another. Consequently, this deformation establishes an engagement structure limiting relative movement between the lock and receiving portions.

The lock and receiving portions are abutted against each other so that at least one of the lock and receiving portions is deformed by the other such that both of the portions are engaged with each other. This deformation establishes an engagement structure limiting relative movement between the lock and receiving portions. Movement of the lock portion is inhibited in directions perpendicular to an insertion direction of the lock portion. Thereby, the lock portion can be prevented from moving relative to the receiving portion. Specifically, the lock portion can be prevented from vibrating or shaking relative to the receiving portion.

The invention also provides a joint structure for joining a pair of connecting members to each other, with one of the connecting members having a lock portion formed in a protruding manner, and the other connecting member being provided with a receiving portion into which the lock portion is insertable. The lock and receiving portions are abutted against each other and the lock portion is inserted into the receiving portion while at least one of the lock and receiving portions is being flexed or temporarily bent. Thereafter, the lock or receiving portion returns to a former shape, whereupon the lock and receiving portions are joined to or engaged with each other. Additionally, the lock and receiving portions are abutted against each other such that at least one of the lock and receiving portions is deformed by the other into engagement with one another. This deformation increases a frictional force between the lock and receiving portions.

The lock and receiving portions are abutted against each other so that at least one of the lock and receiving portions is deformed by the other such that both portions are securely engaged with each other. This deformation increases a frictional force between the lock and receiving portions. Consequently, relative movement is limited between the lock and receiving portions. Thereby, the lock and receiving portions can be prevented from shaking or vibrating relative to each other.

The invention further provides a joint structure for joining a pair of connecting members to each other, with one of the connecting members having a lock portion formed so as to protrude therefrom, and the other connecting member being provided with a receiving portion into which the lock portion is insertable. The lock and receiving portions are abutted against each other and the lock portion is inserted into the receiving portion while at least one of the lock and receiving portions is flexed. Thereafter, the lock or receiving portion is restored to a former shape, whereupon the lock and receiving portions are joined to each other. Additionally, the lock and receiving portions are abutted against each other such that at least one of the lock and receiving portions is deformed by the other into a secure engagement with each other, whereupon this deformation increases a contact area of an engagement portion between the lock and receiving portions.

The lock and receiving portions are abutted against each other so that at least one of the lock and receiving portions is deformed by the other such that both of these portions are engaged with each other. This deformation increases a contact area of an engagement portion between the lock and receiving portions. A total of normal reaction forces acting on contact faces of each of the lock and receiving portions is increased. Accordingly, a frictional force developed on the contact face of each of the lock and receiving portions is also increased. As a result, relative movement is limited between the lock and receiving portions, thereby preventing the lock and receiving portions from shaking relative to each other.

One of the lock and receiving portions is formed with a protruding rib extending along a direction in which the lock portion is inserted into the receiving portion. The lock and the receiving portions are abutted against each other such that the protruding rib presses against a counterpart location on the other of the lock and receiving portions, whereby the counterpart location of the lock or receiving portion is deformed. This pressing force of the protruding rib increases a contact pressure produced upon the counterpart location, thereby easily deforming the counterpart location.

The other connecting member has a protrusion protruding therefrom forming a receiving portion. The receiving portion may be formed with a rectangular opening in a distal end face of the protrusion. The rectangular opening has two opposite sides larger than a width of a corresponding lock portion. Since the protrusion serves as a guide when the lock portion is inserted into the opening, the lock portion can be easily inserted into the opening. Furthermore, since the two opposite sides of the opening are larger than the width of the corresponding lock portion, the lock portion can be easily inserted into the opening.

The protruding rib is formed on the lock portion. A portion of the opening directly abutting the rib on the lock portion comprises a thinner portion extending from a proximal end side towards an opposed inner wall of the opening. Consequently, the protruding rib can easily deform the thinner portion of the opening.

The lock portion is formed into approximately the shape of a flat plate. The protruding rib is formed on one side of the lock portion so as to extend along an insertion direction of the lock portion. The lock portion also includes a lock claw provided on a side of the lock portion located opposite to the side containing the rib. The lock claw engages the receiving portion to hold the lock and receiving portion together in a joined state when the lock or receiving portion is restored to an initial, unbent configuration. Consequently, the lock portion engages the receiving portion on at least two side surfaces when the lock and receiving portions are in a joined state. Therefore, the lock and receiving portions can be stably joined to one another.

At least one of the lock and receiving portions includes a guiding inclined surface formed on an abutting portion thereof for contact against a counterpart side of the other of the lock and receiving portions. Consequently, the lock portion may be easily inserted into the receiving portion.

The connecting members may have two or more pairs of locks and receiving portions. An orientation of engagement of at least one pair of lock and receiving portions may differ from an orientation of engagement of an adjacent pair of lock and receiving portions. Consequently, since all lock and receiving portions are prevented from shaking in two or more orientations, the connecting members may be firmly joined to each other.

The invention further provides a joint structure for joining a pair of connecting members to each other. One of the connecting members comprises a lock portion formed in a protruding manner, and the other connecting member is provided with an opening which is defined by a wall and into which the lock portion is insertable. The lock portion and the wall of the opening are abutted against each other and the lock portion is inserted into the opening while at least one of the lock portion and the wall of the opening is resiliently flexed. Thereafter, the lock portion or the wall of the opening returns towards an initial shape, whereupon the connecting members are joined to each other. The lock portion is formed into a plate shape and has one side provided with a lock claw. The lock claw engages the opening so as to hold the lock portion and the opening in a joined state when the lock portion or the wall of the opening is restored to an initial shape. The lock portion has an opposite side with a pair of ribs formed on both widthwise ends thereof so as to respectively extend along an insertion direction of the lock portion. The opening is formed in a distal end face of a protrusion protruding from the other connecting member. The opening is formed into such a rectangular shape that two opposite sides thereof are larger than a width of a corresponding lock portion. A wall of the opening includes a portion directly abutting against the lock portion. This abutting portion is formed with a thinner portion extending from a proximal end side towards an opposed inner wall of the opening. The lock portion and the wall of the opening are abutted against each other such that the ribs press upon the thinner portion, thereby deforming the thinner portion. Due to this deformation, the lock portion and the opening are securely engaged with each other. An engagement structure is established in which relative movement is inhibited between the lock portion and the opening.

The lock portion has an opposite side with a pair of ribs formed on both widthwise ends thereof so as to respectively extend along an insertion direction of the lock portion. Consequently, since the lock portion deforms the opening without being inclined widthwise, both the lock and the receiving portions can be firmly joined to one another.

The invention still further provides a joint structure for joining a pair of connecting members to each other. One of the connecting members comprises a lock portion formed in a protruding manner, and the other connecting member is provided with an opening that is defined by a wall and into which the lock portion is insertable. The lock portion and the wall of the opening are abutted against each other and the lock portion is inserted into the opening while at least one of the lock portion and the wall of the opening is resiliently flexed. Thereafter, the lock portion or the wall of the opening is restored to an initial shape, whereupon the connecting members are joined to each other. The lock portion is formed into a substantially plate shape and has one side surface provided with a lock claw, able to engage the opening so as to hold the lock portion and the opening in a joined state when the lock portion or the wall of the opening is returned to an initial shape. The lock portion may have another side surface opposite to the side containing the lock claw. The other side surface comprises three ribs formed on both widthwise ends and on a substantially central portion thereof. The three ribs respectively extend along an insertion direction of the lock portion. The opening is formed in a distal end face of a protrusion protruding from the other connecting member. The opening is also formed into such a rectangular shape that the two opposing long sides thereof are larger than a width of a corresponding lock portion. The wall of the opening may include a portion directly abutting the lock portion. This abutting portion may be formed with a thinner portion extending from a proximal end side towards an opposite inner wall of the opening. The lock portion and the wall of the opening are abutted against each other such that the protruding ribs press upon the thinner portion, thereby deforming the thinner portion. Upon this deformation, the lock portion and the opening are securely engaged with each other. An engagement structure is established in which relative movement of the lock and receiving portions, and subsequently the connecting members, is limited by engagement between the lock portion and the opening.

The lock portion has an opposite side with three ribs formed on both widthwise ends and a substantially central portion thereof so as to respectively extend along an insertion direction of the lock portion. When the lock portion deforms the opening, a number of contact faces between the lock portion and the opening is increased. Consequently, frictional forces acting upon the contact faces are also increased, and both the lock and the receiving portions can be firmly joined to each other.

BRIEF DESCRIPTION OF THE DRAWINGS

Other objects, features and advantages of the present invention will become clear upon reviewing the following description of the embodiments with reference to the accompanying drawings, in which:

FIGS. 4(A) and 4(B) are plan views of a lock hole and a lock arm;

DETAILED DESCRIPTION OF THE PREFERRED EMBODIMENTS

Figure 1:
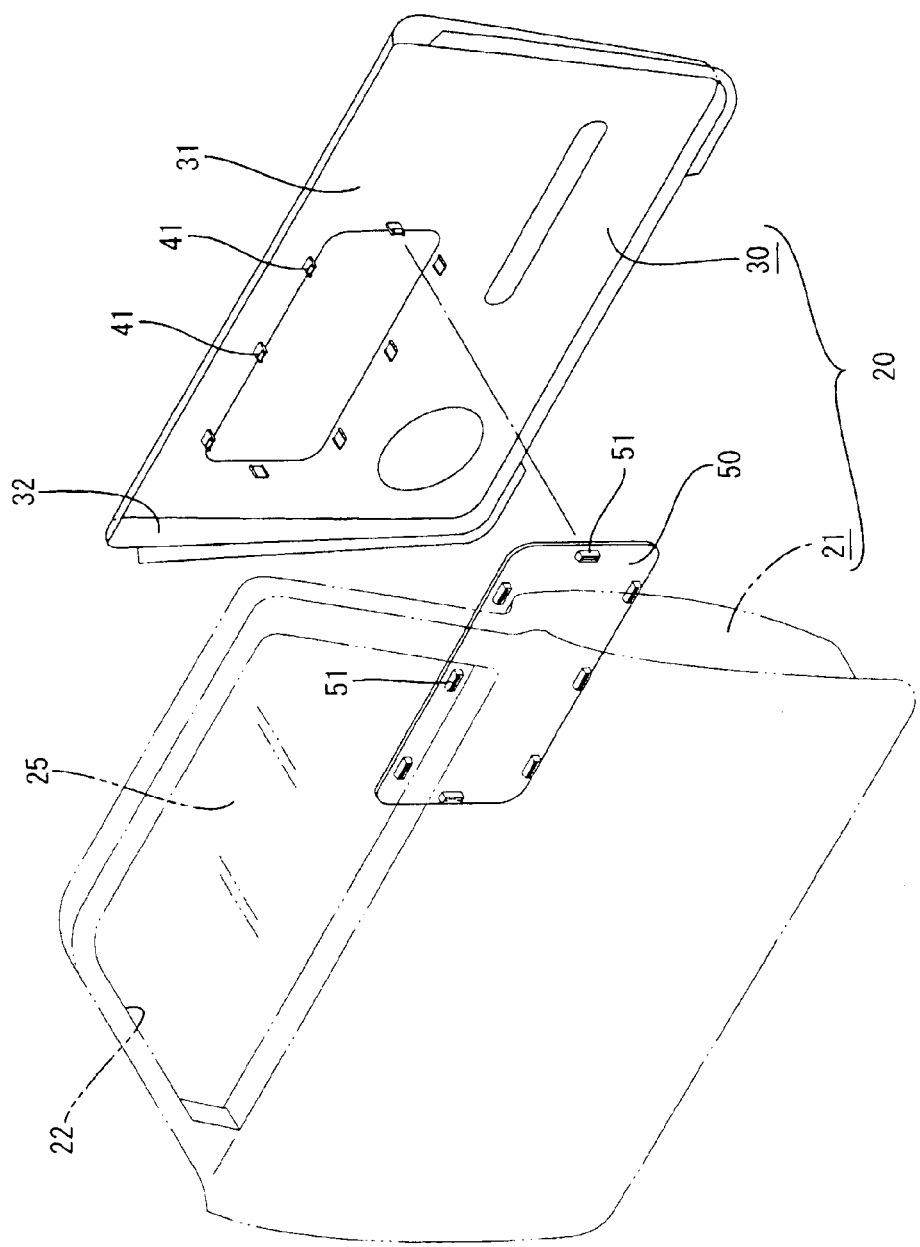
FIG. 1 is an exploded perspective view of a side door to which a coupling structure is applied in accordance with one embodiment of the present invention.

Several embodiments of the present invention will be described with reference to FIGS. 1 to 14. A coupling structure for connecting members is applied to a side door 20 of an automobile in a first embodiment. Referring to FIG. 1, reference numeral 21 designates a metallic door panel hingedly mounted on a body of an automobile (not shown) so as to be closed and opened. The door panel 21 is formed into a configuration conforming to outer dimensions of the body. A window frame 22 is open at an upper half of the door panel 21. A window glass 25 is configured so as to fit within the window frame 22.

A door trim 30, serving as a connecting member, is disposed on the door panel 21 to an interior of the automobile. The door trim 30 is provided with a resin panel 50 corresponding to another connecting member, as will be described later. The door trim 30 includes a base plate 31, sized so as to cover a lower half of the door panel 21, and an inwardly directed side wall 32, extending along an overall periphery of the base plate 31. The door trim 30 and the resin panel 50 have respective outsides positioned towards an exterior of the automobile, and respective insides positioned towards an interior of the automobile.

The resin panel 50 may be an attachment for mounting a cup holder or door handle (neither is shown) and may be formed into a shape of a substantially flat plate in this embodiment. The resin panel 50 is attached to an upper outside portion of the base plate 31 of the door trim 30. The resin panel 50 may be made from the same resin material as the door trim 30.

Holding structure of the door trim 30 and resin panel 50 will be now be described. Eight slender, rectangular receiving portions 51, serving as protrusions in this invention, are annularly disposed in various orientations on an outside of the resin panel 50 so as to extend along an outer periphery of the resin panel 50. The receiving portions 51 protrude from an outer side surface of the resin panel 50. Each receiving portion 51 has a distal end with an opening in which a rectangular lock hole 52 serves as a receiving portion for a lock arm 41, which will be described later. The lock hole 52 has a proximal end (the left side as viewed in FIG. 6) that is wider than a distal end thereof. A proximal end side of the lock hole 52 is chamfered along an entire periphery into an arc shape in order to increase an insertion efficiency of the lock arm 41 into the lock hole 52. Since a plurality of lock arms 41 need to be simultaneously inserted into respective receiving portions 51, a chamfered edge 56 of the proximal end side of the lock holes 52 allows for an easier assembly. For example, in this embodiment the receiving portions 51 are disposed so that upper and lower, as well as front and rear, receiving portions 51 are opposed to each other across the resin panel 50.

Figure 2:
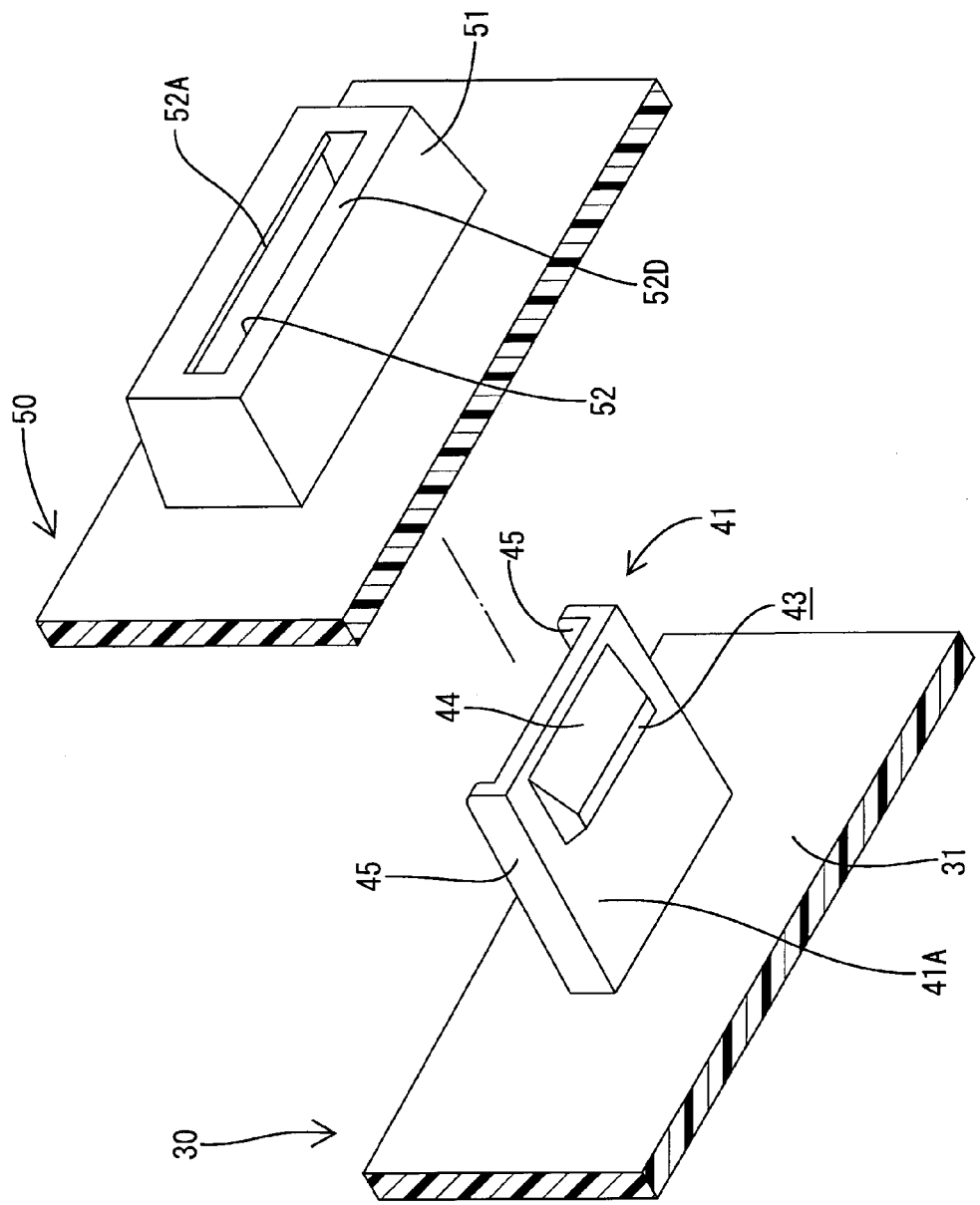
FIG. 2 is an enlarged view of a receiving portion and a lock arm.
Figure 3:
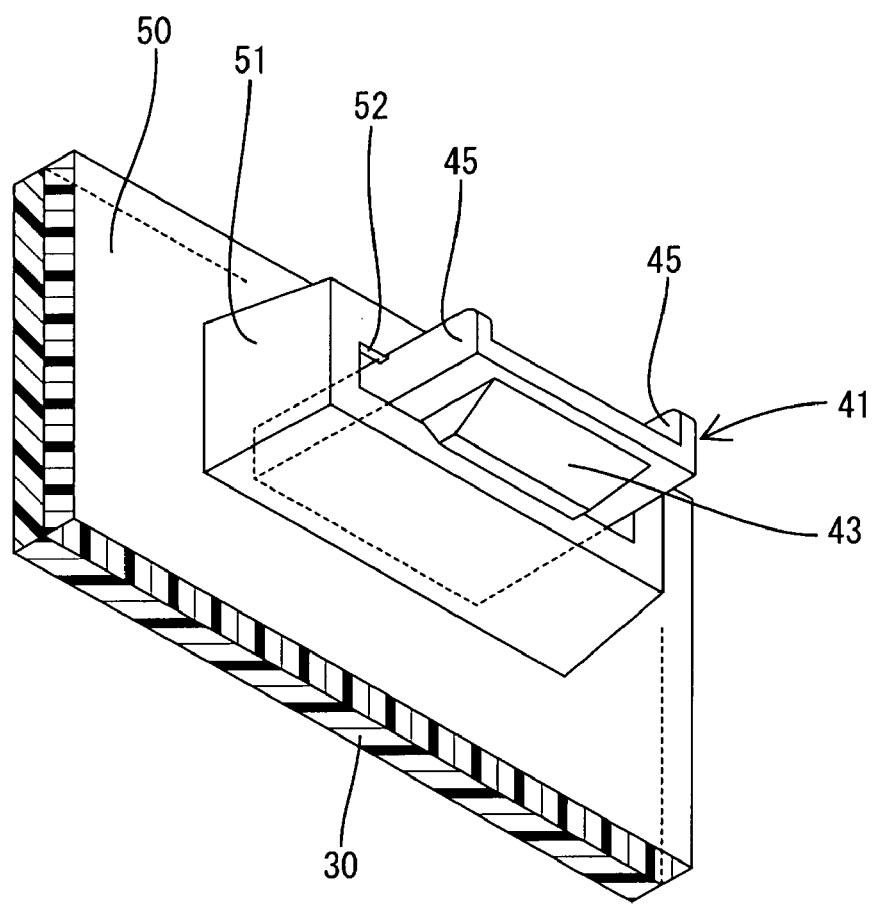
FIG. 3 is an enlarged view of the receiving portion engaged with the lock arm.
Figure 5:
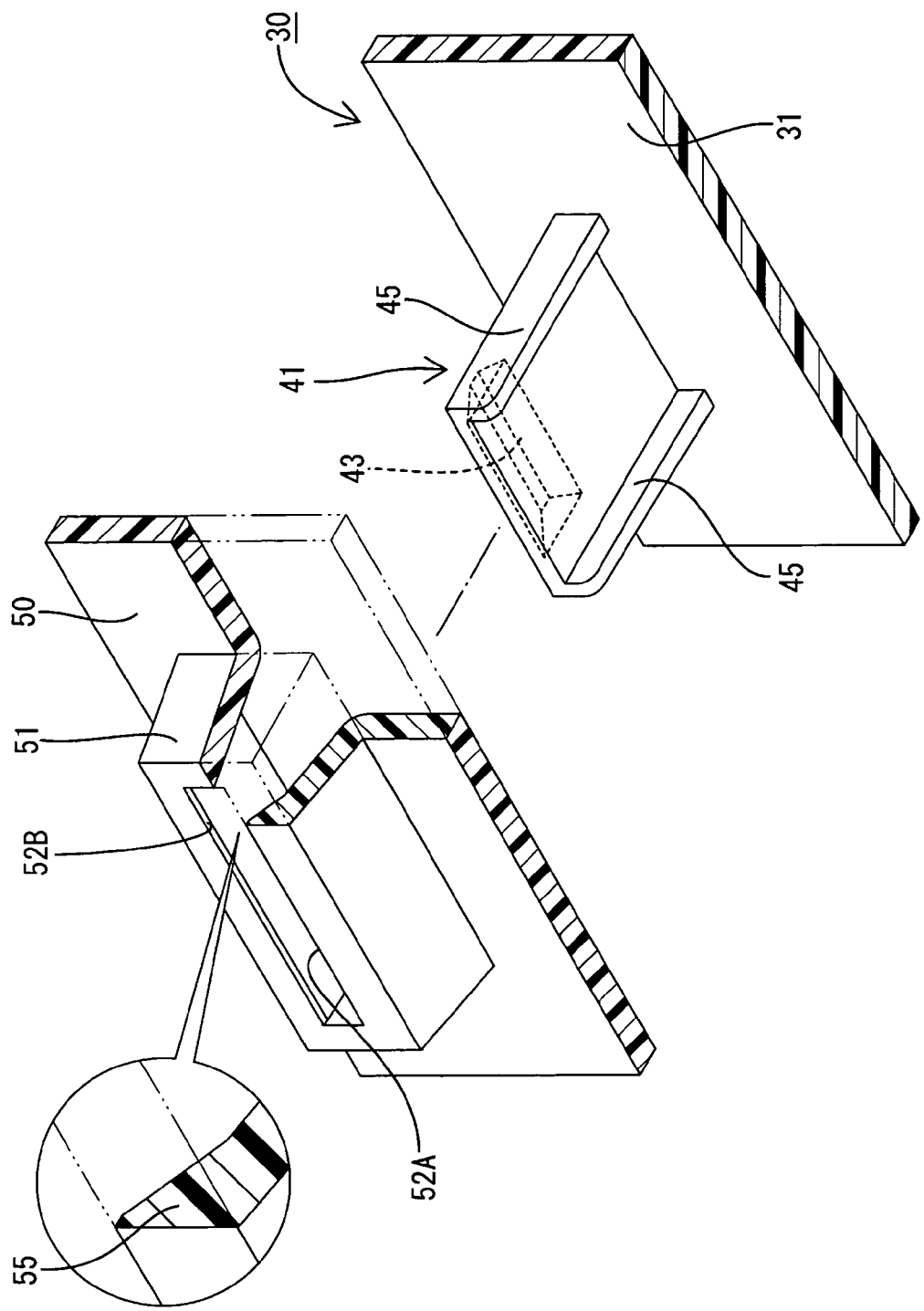
FIG. 5 is a partially sectioned perspective view showing a location of a low-stiffness portion and an orientation of the lock arm prior to insertion.

The lock arms 41, serving as lock portions in this invention, are formed on an outer surface of the base plate 31 of the door trim 30, so as to protrude towards the resin panel 50. The lock arms 41 are positioned and oriented so as to be directly opposed to and insertable into corresponding receiving portions 51. The lock arms 41 each include a flat plate-shaped arm piece 41A (FIG. 2) and a pair of ribs 45 extending along an insertion direction of the lock arm. As shown in FIG. 2, a rib 45 is positioned on left and right edges of one side of the arm piece 41A and extends upward from the arm piece 41A. The ribs 45 are formed along an overall length of the arm piece 41A. Long sides (a width direction, i.e., left to right as shown in FIG. 2) of the lock hole 52 have a larger width dimension than a corresponding width of the arm piece 41A.

A lock claw 43 protrudes downward from a distal end of an underside of the arm piece 41A (an opposite surface side from the ribs 45). The lock claw 43 is engageable with an opening edge 52D of the lock hole 52, thereby being capable of holding the resin panel 50 on the door trim 30 in such a way that the resin panel can be prevented from falling off of the door trim. The lock claw 43 has a distal end provided with an inclined guide portion 44. The inclined guide portion 44 is gently inclined in the insertion direction of the lock arm 41 and adapted to guide the lock arm 41 during assembly with the receiving portion 51. If the lock arm 41 were merely formed into a shape of a flat plate, i.e., without the ribs 45, upon completion of assembly of the lock arm to the receiving portion, a gap may exist between the arm piece 41A of the lock arm 41 and an inner wall of the lock hole 52. When there is a gap between the lock arm 41 and the lock hole 52, the lock arm 41 is free to move within the lock hole 52, thereby vibrating or shaking (particularly in a direction of arrows in FIG. 4, from side to side). As a result, engagement of the lock claw 43 with the lock hole 52 may diminish and accordingly, there is a possibility of insufficient holding or retaining force. In view of this problem, in this embodiment the lock arm 41 is provided with ribs 45 limiting movement of the lock arm 41 within the lock hole 52. More specifically (as shown in FIG. 4), reference symbol Y designates a height from a lower end of the lock claw 43 to an end face 45A of a rib 45. Reference symbol R designates an opening height of the lock hole 52. Height Y is set so as to be larger than opening height R. The rib 45 and lock claw 43 deform the lock hole 52 so as to increase an inter-wall dimension of the lock hole 52 when the lock arm 41 has been inserted into the lock hole 52.

Figure 6:
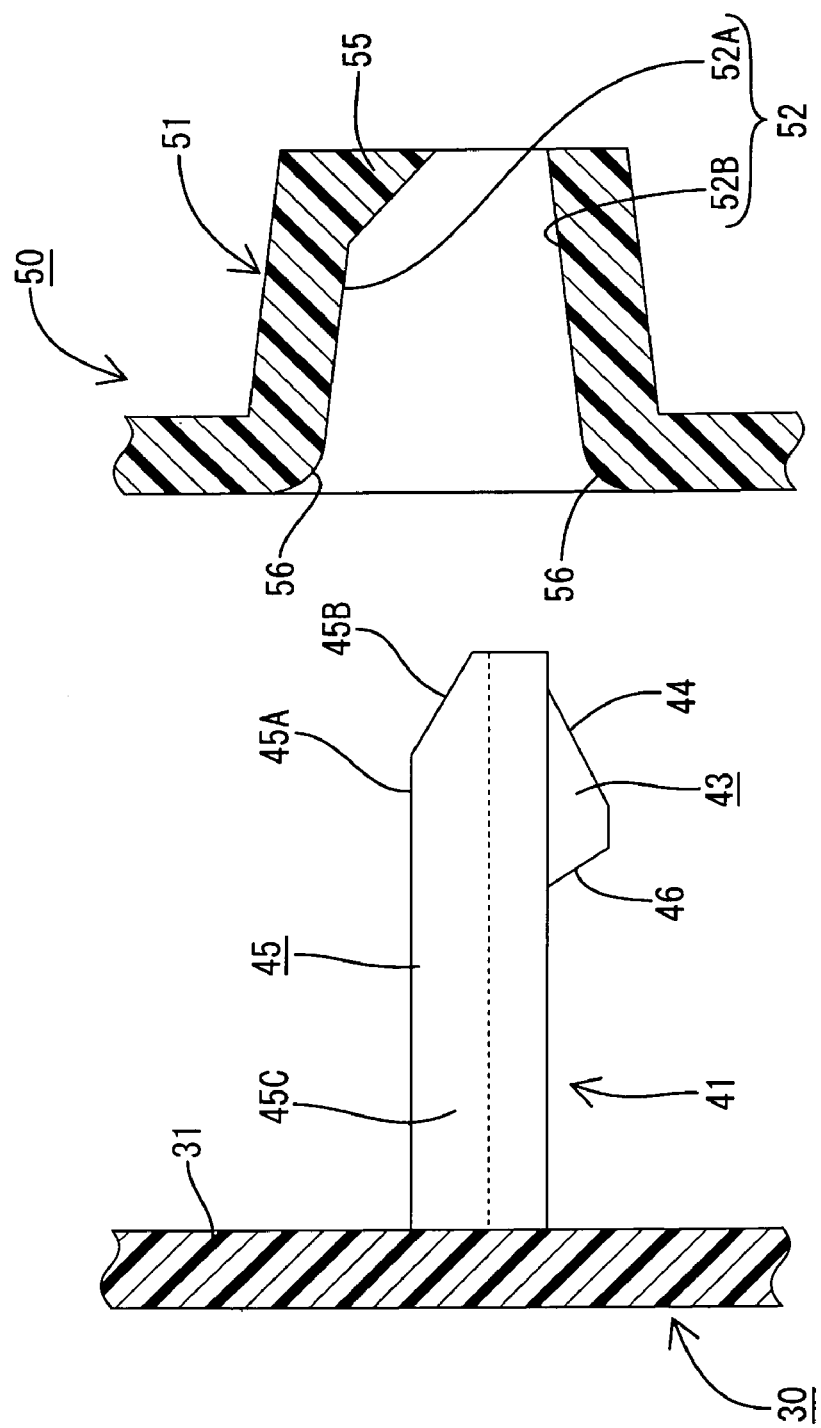
FIG. 6 is a sectional view showing a state before the lock arm is inserted into the receiving portion.
Figure 7:
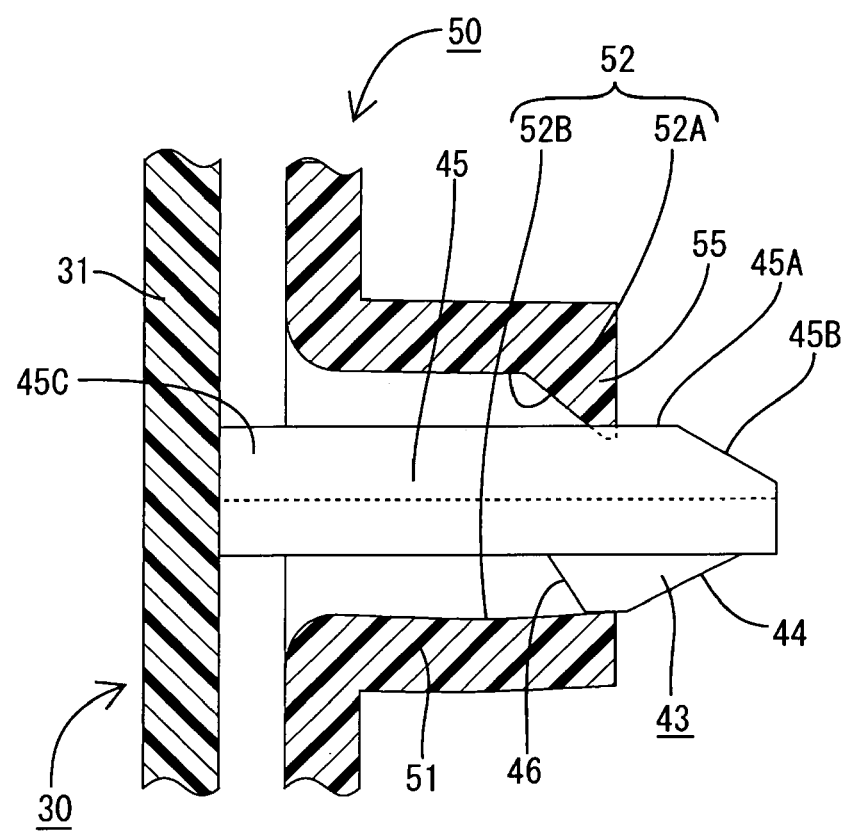
FIG. 7 is a sectional view showing a state where the lock arm has been partially inserted into the receiving portion.
Figure 8:
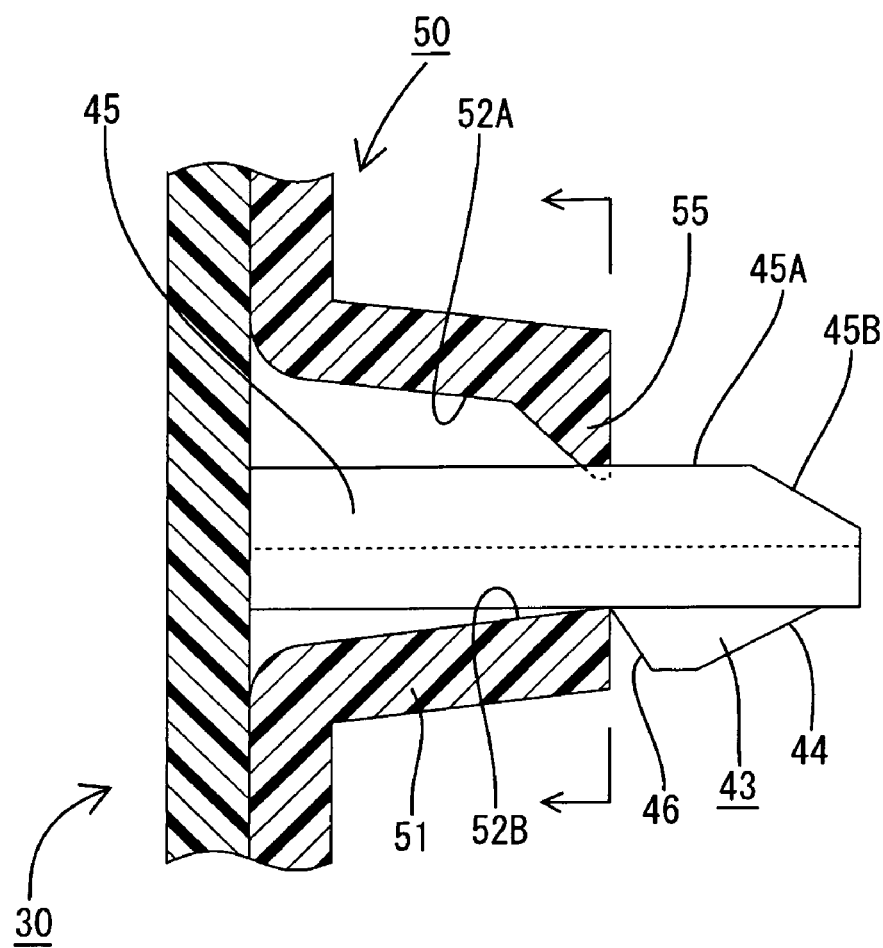
FIG. 8 is a sectional view showing a state where the lock arm is in full engagement with the receiving portion.

On the other hand, a low-stiffness portion 55 is provided on a distal end of an inner wall 52A of the lock hole 52 at a location directly opposing the ribs 45. The low-stiffness portion 55 extends across an entire width of the distal end of the inner wall 52A. The low-stiffness portion 55 (corresponding to a thinner portion in this invention) has a thickness gradually reduced from a distal end side thereof toward an opposite inner wall 52B side, thereby substantially resulting in a taper. Additionally, the ribs 45 have a front end formed with a tapered portion 45B (corresponding to the inclined face 44) gradually increasing towards the panel 30 (to the left as seen in FIG. 6).

As a result of the above-described construction, a contact area of the low-stiffness portion 55 with the ribs 45 is small at an initial stage of insertion of the lock arm 41. Furthermore, since the ribs 45 are moving with respect to the lock hole 52, a contact portion of the ribs 45 with the low-stiffness portion 55 changes or transfers from distal end tapered portions 45B, to proximal ends 45C, as insertion progresses. However, since the low-stiffness portion 55 is seen as a relatively fixed element, the same contact area of the low-stiffness portion 55 is normally in contact with the ribs 45.

Accordingly, when the lock arm 41 is inserted into the lock hole 52, the ribs 45 side is not significantly deformed. Primarily, the low-stiffness portion 55 is deformed or altered, whereupon the ribs 45 interferingly engage the low-stiffness portion 55. Further, reference symbol H designates a height H from an underside of the arm piece 41A to the end face 45A of a rib 45. Since the height H is set to be larger than the opening height R of the lock hole 52, a rib 45 transforms a portion of the low-stiffness portion 55 into a concave-convex type fitting. The fitting connects the rib 45 together with the low-stiffness portion 55 even after walls of the lock hole 52 are elastically restored to their initial shape at completion of assembly, as shown in FIG. 4B. Consequently, free play or ability of the lock arm 41 to move within the lock hole 52 is drastically limited.

Figure 9A:
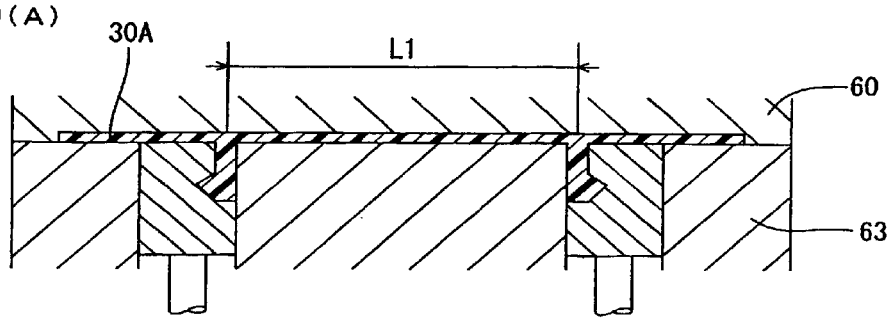
FIGS. 9(A)-9(C) are sectional views showing a die structure of a forming die for a door trim.
Figure 9B:
Figure 9B:
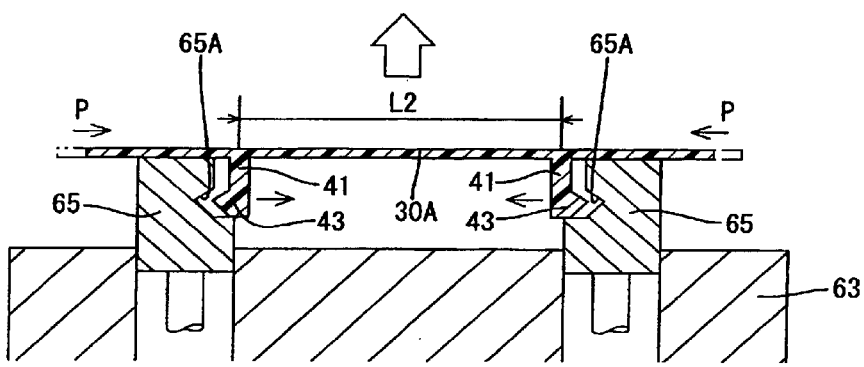
Figure 9C:
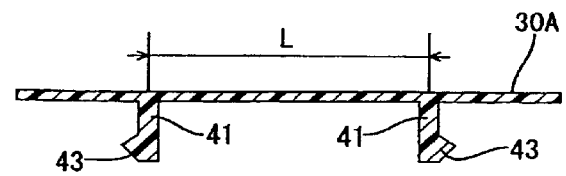
Figure 10:
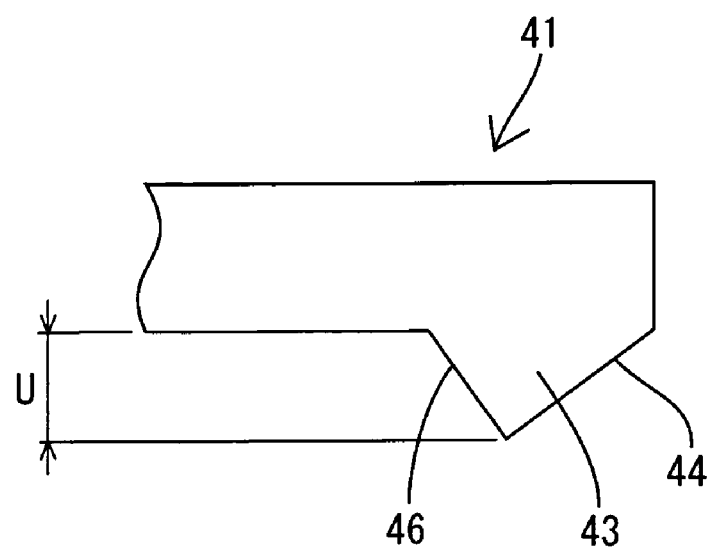
FIG. 10 is an enlarged view showing a configuration of a lock claw.

On the other hand, the door trim 30 comprises the generally flat, plate-shaped, base plate 31 and the lock arms 41 protruding from the base plate 31 and having outwardly directed lock claws 43, as described above. FIGS. 9(A)-9(C) show a forming die for the aforesaid panel. As shown, the forming die includes an upper die 60 having a cavity 60A for forming the base plate 31, and a lower die 63 opposed to the upper die. Either upper or lower die 60 or 63 is moved forward and backward in a direction perpendicular to the base plate 31 (up and down as seen in FIG. 9), so that the forming die is opened. The upper die 60 serves as a moving die in this embodiment. Furthermore, arm forming dies 65, each provided with a cavity 65A for forming a lock arm 41, are embedded within the lower die 63 so as to be moved forward and backward. It is considered that a product is removed from the die by moving the arm forming dies 65 along the same direction as the upper die 60. Thus, die construction can be simplified when the arm forming dies 65 are moved in the same direction as the die-opening direction.

However, in a case where a partial protrusion (such as the lock claw 43) is provided on a side of the lock arm 41, the lock claw 43 may be caught in the cavity 65A of arm forming die 65 when the door trim 30 is removed from the die, as shown in FIGS. 9(A)-9(C). Therefore, a product may not be easily removable from the die. In this embodiment, however, a protrusion height U (FIG. 10) of the lock claw 43 is set at a predetermined value and the lock claw 43 is provided with an interference preventing guide face 46 so that the door trim 30 can be removed from the die without experiencing great difficulty or die lock.

Setting of the protrusion height U of the lock claw 43 will now be described. The door trim 30 is made by intrusion forming, in other words, molten resin material is poured into a cavity of a forming die and allowed to cool and solidify. Subsequently, the die is opened so that the door trim 30, as a complete unit, is removed from the die. However, the door trim 30 thermally shrinks with passage of time after die opening, thereby forming into a final shape of a product. The following equations (1) and (2) are thus obtained:

$$L=(1-S)L1 \quad (1)$$

$$L2=(1-S1)L1 \quad (2)$$

Where:
L1 is a width between lock arms 41 during forming and before die opening;
L2 is the width between lock arms 41 immediately after the die opening;
L is the width between lock arms 41 at a time of a fully formed product or termination of heat shrinkage;
S is a heat shrinkage factor of resin material during a period from start of forming of the door trim 30 to completion of forming (until a final product shape is obtained); and
S1 is a heat shrinkage factor during a period from the start of forming to the die opening.

Accordingly, the following equation (3) represents an amount of shrinkage T of the resin material between the lock arms 41, immediately after die opening:

$$T=L1-L2=L\times S1/(1-S) \quad (3)$$

A shrinkage direction of the resin material (direction P as shown in FIG. 9(B)) is a direction in which interference is avoided between the forming die and the lock claws 43. Accordingly, when the protrusion height U of the lock claw 43 is set so as to meet the following equation (4), the resin material shrinks by an amount corresponding to the protrusion height U of the lock claw 43, whereupon interference is avoided between the lock claw 43 and cavity 65A:

$$U \leq T/2 \leq L \times S1/2(1-S) \quad (4)$$

Furthermore, since the heat shrinkage factor S1 is generally 0.3S, the following equation (5) is obtained when 0.3S is substituted for S1 in equation (4):

$$U \leq T/2 \leq 3LS/20(1-S) \quad (5)$$

As obvious from the foregoing, even when the lock arm 41 has a partial protrusion, the protrusion height U of the lock arm is set so as to meet equation (5). As a result, the upper die 60 is opened after the door trim 30 has been formed. Subsequently when the arm forming dies 65 are pushed out in the same direction, the door trim 30 can be removed from the die. The heat shrinkage factor S1 may increase or decrease depending upon material used for the door trim 30 and other various forming conditions (i.e., die temperature, and the like).

Furthermore, the lock claw 43 has a guide face 46 formed opposed to the guide inclination 44 on a side interfering with cavity 65A of arm forming die 65 when the door trim 30 is removed. The guide face 46 is inclined relative to a direction in which the door trim 30 is removed (in a direction of the large arrow as shown in FIG. 9(B)). Accordingly, even if heat shrinkage of the door trim 30 is insufficient after die opening, such that the lock claw 43 still physically interferes with the cavity 65A of the arm forming die 65, the door trim 30 can still be removed from the die. The guide face 46 causes the lock arm 41 to flex in interference avoiding directions (towards a center of the door trim 30 and indicated by small arrows in FIG. 9(B)), allowing for ease of removal of the door trim 30.

An assembly procedure of the side door 20 will now be described. Initially, the resin panel 50 is placed proximate to the door trim 30 and positioned so that the receiving portions 51 are directly opposed to the corresponding lock arms 41. Upon completion of this positioning, the resin panel 50 is placed in contact with the door trim 30. Thus, individual lock arms 41 are inserted into respective receiving portions 51.

Subsequently, the resin panel 50 is pushed further towards the door trim 30. The distal end of lock claw 43 begins to interfere with inner wall 52B of lock hole 52, and end face 45A of rib 45 abuts against a distal end of low-stiffness portion 55. As a result, the lock arms 41 are inserted toward the distal end side while elastically deforming the walls of the respective receiving portions 51, typically by spreading width sides of the lock holes 52 apart from one another.

Since the rib 45 moves relative to the low-stiffness portion 55, the contact portion of the rib 45 with the low-stiffness portion 55 is changed from the distal tapered portion 45B side to the proximal end 45C side as insertion progresses. On the other hand, the low-stiffness portion 55 is relatively fixed and has the same general area in continual contact with the ribs 45. Accordingly, when the lock arms 41 are inserted into the respective receiving portions 51, respective ribs 45 deform low-stiffness portions 55, whereupon the ribs 45 interferingly engage the low-stiffness portions 55. Consequently, the low-stiffness portions 55 are gradually indented. When lock arm 41 has been completely inserted into the receiving portion 51, the walls of the receiving portion 51 are elastically returned to their initial unflexed or unspread shape, so that the lock claw 43 engages opening edge 52D of lock hole 52. In this state, the lock arm 41 is held between the inner wall 52B of the lock hole 52 and the low-stiffness portion 55.

An engagement structure is formed between the lock arms 41 and the lock holes 52 through resiliency of the walls of the lock holes 52 and deformation of the low-stiffness portions 55, whereupon movement relative to each other is limited. Consequently, the door panel 50 is securely held onto the door trim 30 and prevented from falling off (inadvertent removal). Resiliency of the lock holes 52 increases a contact area of engagement portions of the lock arms 41 and the lock holes 52, or in other words, increases a number of contact faces when the lock arms 41 and lock holes 52 have been completely engaged with each other, as shown in FIG. 4(B). As a result, a total normal reaction force acting on a contact face of each of the lock arm 41 and lock hole 52 is increased, and accordingly, frictional force developed on the contact face of each of the lock arm 41 and lock hole 52 is also increased. Furthermore, in the aforesaid state, the inner wall 52A of the lock hole 52 or the low-stiffness portion 55 and the ribs 45 are ruggedly fitted with each other, as shown in FIG. 4(B). Subsequently, the door trim 30 is supplied to a predetermined assembly position on the inner side of the door panel 21 and thereafter, assembly is performed and the side door 20 is assembled. As seen in FIG. 1, a plurality of pairs of the lock arms 41 and the receiving portions 51 may differ from each other in their orientations of engagement (i.e., rotated around an axis parallel to the insertion direction).

In the foregoing embodiment, when the lock arm 41 is inserted into the receiving portion 51, the ribs 45 interface with the lock hole 52 while deforming the low-stiffness portion 55. As a result, the lock hole 52 and the ribs 45 are ruggedly fitted with each other. Free play of the lock arm 41 is limited relative to the lock hole 52. Accordingly, shaking of the resin panel 50 relative to the door trim 30 can be restrained and reliability of a locking connection can be improved. The ribs 45 engage the lock hole 52 even after the walls of the lock hole 52 have been resiliently restored to their original or initial shape. As a result, a frictional force is increased between the ribs 45 and the lock hole 52 and accordingly, both are more firmly joined to each other.

Furthermore, a resilient return of the walls of the lock hole 52 to their initial shape increases the contact area of the engagement portions of the lock arm 41 and the lock hole 52 (i.e., increases the number of contact faces). As a result, the total of the normal reaction forces acting upon a contact face is increased and accordingly, the frictional force developed on the contact face of each of the ribs 45 and the lock hole 52 is also increased. Consequently, both the lock arm 41 and the receiving portion 51 are more firmly joined to each other.

Furthermore, the lock arm 41 is formed with the ribs 45 extending along the insertion direction thereof. The lock hole 52 is pressed by the ribs 45 so as to be deformed. A pressing force applied by the ribs 45 with a small abutment area can develop a large bearing force upon the lock hole 52. Thus, the lock hole 52 can be readily deformed. Furthermore, the low-stiffness portion 55 is formed on a portion of the lock hole 52 abutting directly against ribs 45 of the lock arm 41. The thickness of the low-stiffness portion 55 is gradually decreased from the proximal end side toward the inner wall 52B of the lock hole 52. Consequently, the low-stiffness portion 55 can be more readily deformed. Additionally, since the ribs 45 are formed on both ends widthwise of the arm piece 41A, the lock hole 52 can be deformed without a widthwise inclination of the lock arm 41, whereupon both the lock arm 41 and the receiving portion 51 can be stably joined to each other.

Rectangular lock hole 52 is formed on the distal end of the receiving portion 51 protruding from the resin panel 50. The lock hole 52 has long sides (in the width direction) that directly oppose each other. Each of the long sides of the lock hole 52 has a larger width than a corresponding width of the arm piece 41A. As a result, since the walls of the receiving portion 51 serve as a guide when the lock arm 41 is inserted into the lock hole 52, the lock arm can be easily inserted. Furthermore, since the lock hole 52 has a width dimension larger than the width of the arm piece 41A, the lock arm 41 can be more easily inserted into the lock hole 52. Additionally, since lock arm 41 is formed with an inclined guide portion 44 and a tapered portion 45B, the lock arm 41 can further be more easily inserted into the lock hole 52. Accordingly, assembly of the connecting members can be performed smoothly.

Furthermore, the arm piece 41A is substantially formed into a plate shape and has one side provided with the ribs 45 and the opposite side provided with the lock claw 43. The lock claw 43 engages the lock hole 52 when the lock hole 52 has been resiliently restored to its initial shape. Thus, since both sides of the lock arm 41 engage the lock hole 52 while the lock arm 41 and the lock hole 52 are in a joined state, both are stably joined to each other.

Furthermore, the door trim 30 and the resin panel 50 are provided with a plurality of the lock arms 41 and a corresponding plurality of the lock holes 52. Since paired lock arms 41 and receiving portions 51 differ from each other in their orientation of engagement, shaking and vibration between the door trim 30 and the resin panel 50 can be prevented in a plurality of directions. Accordingly, the door trim 30 and the resin panel 50 can be firmly joined together.

Figure 11A:
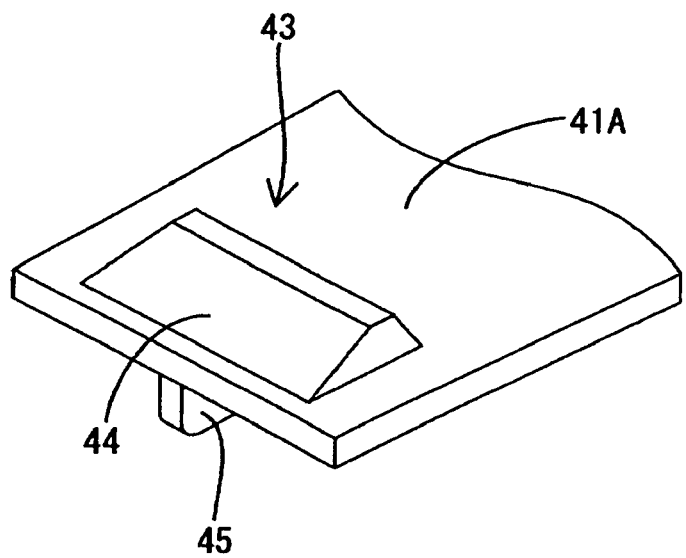
FIGS. 11(A) and 11(B) are perspective views of the lock arm of the coupling structure in accordance with other embodiments of the invention.
Figure 11B:
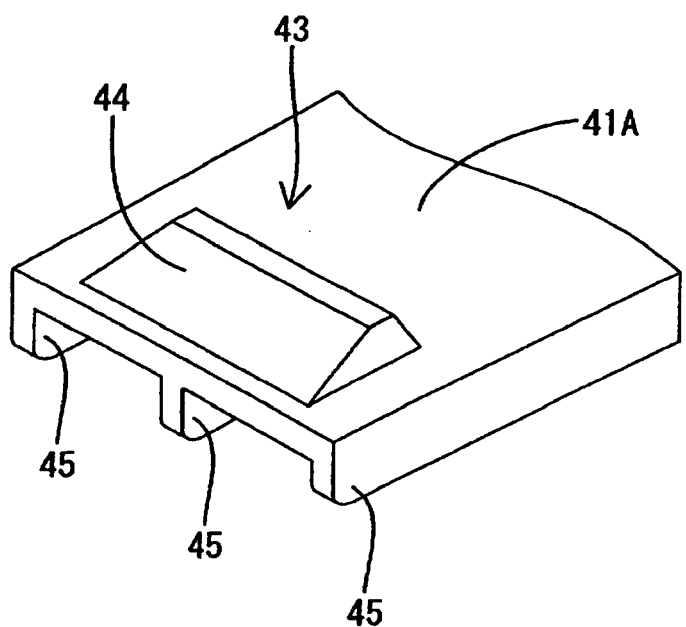

Modified forms of the foregoing embodiment will now be described. The lock arm 41 is formed with a pair of ribs 45 in the foregoing embodiment. However, there is no limitation as to a number of the ribs 45, provided that they are formed on the side opposite to the side containing the lock claw 43. Only one rib 45 may be provided as shown in FIG. 11(A). Further, as shown in FIG. 11(B), three protruding ribs 45 may be formed on both widthwise ends and a central portion of the arm piece 41A so as to be aligned along the insertion direction of the arm piece 41A, as shown in FIG. 11(B). Consequently, a number of contact faces with the lock holes 52 can be increased as a result of deformation caused by the ribs 45. Accordingly, a frictional force acting upon the contact faces can be made larger; whereupon the lock arm 41 and lock hole 52 can be more firmly joined together.

Figure 12:
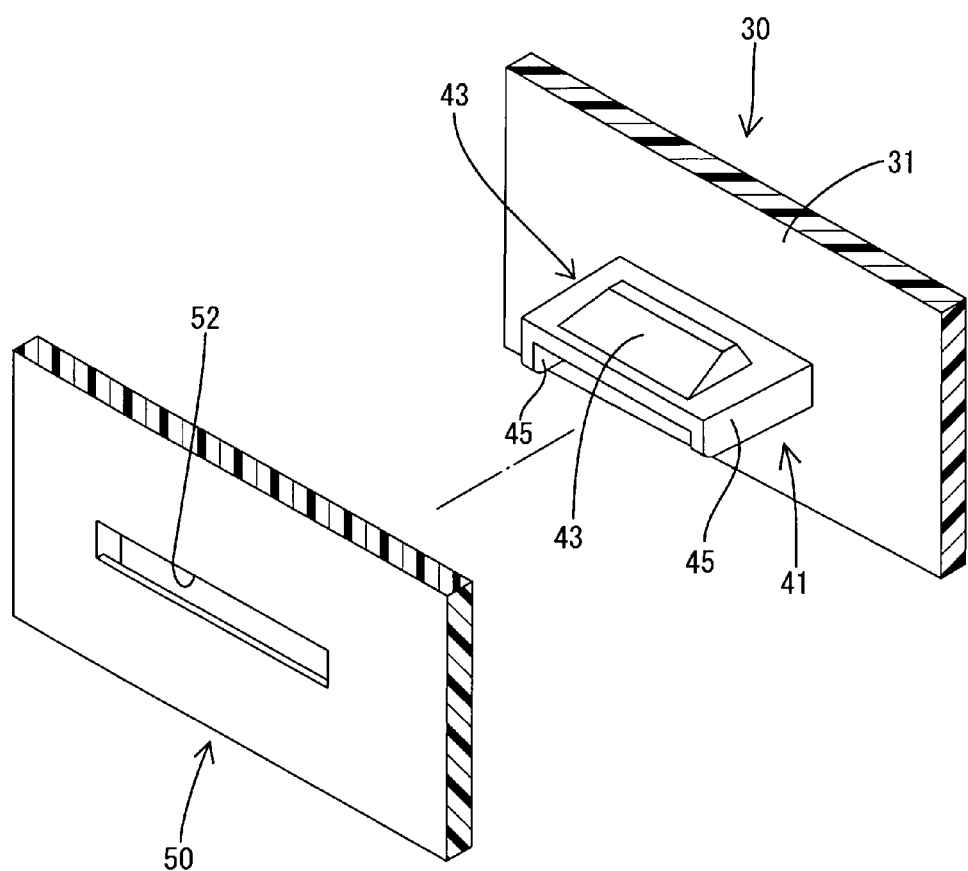
FIG. 12 is a perspective view of the lock arm and receiving portion of the coupling structure in accordance with another embodiment of the invention.
Figure 13:
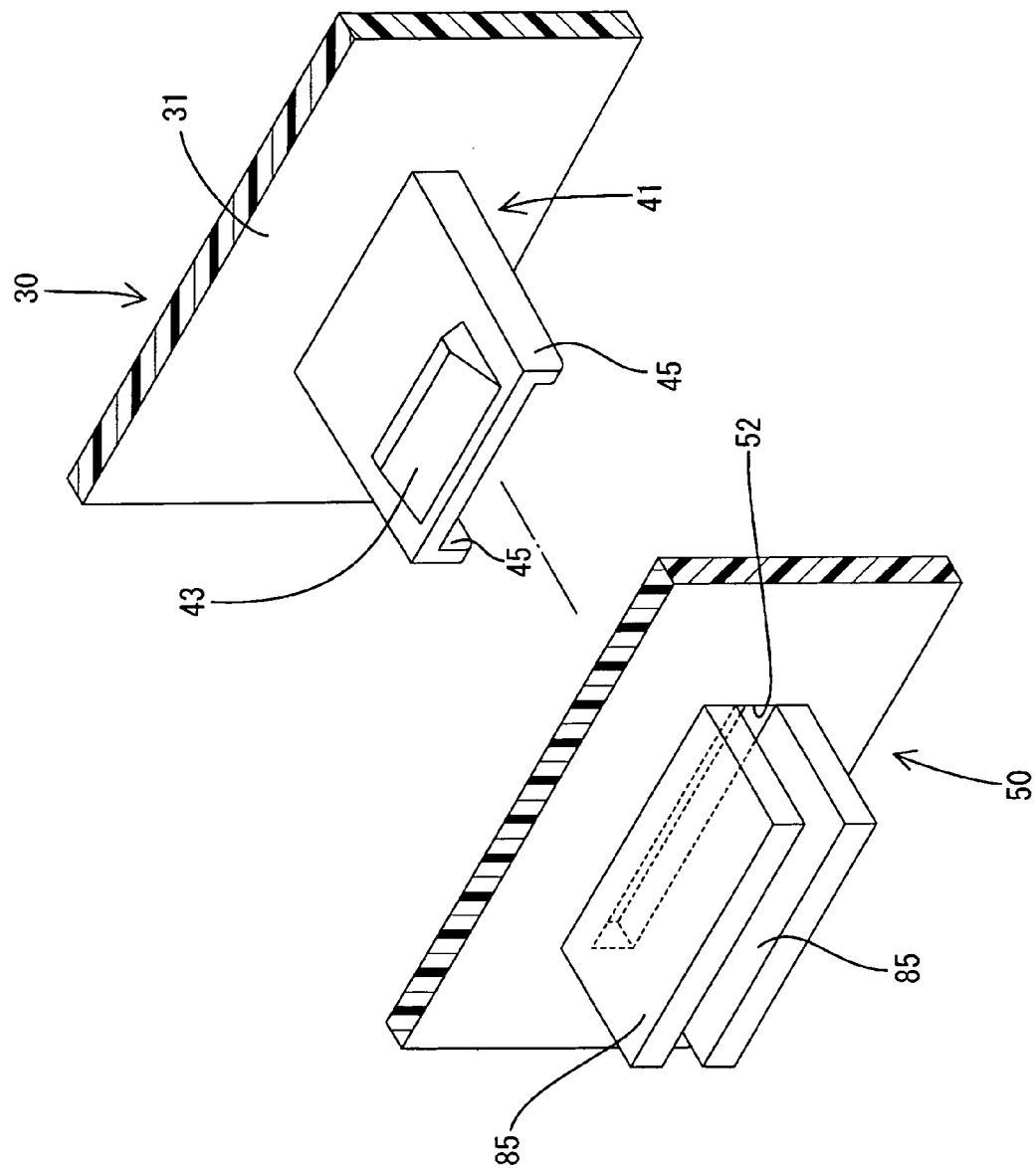
FIG. 13 is a perspective view of the lock arm and receiving portion of the coupling structure in accordance with a further embodiment of the invention.

Each lock hole 52 is formed on the distal end face of the rectangular receiving portion 51 in the foregoing embodiment. However, the lock arm 41 may be capable of being inserted into and engaged with many other types of configurations formed on the resin panel 50. For example, what is formed on the resin panel 50 may be essentially a rectangular hole, as shown in FIG. 12, or a pair of opposed walls 85, as shown in FIG. 13.

Figure 14:
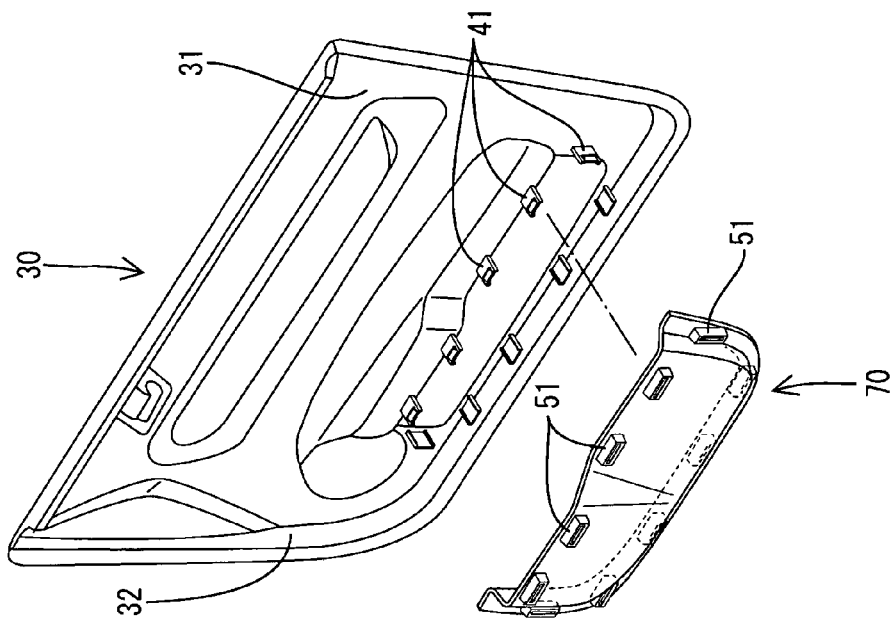
FIG. 14 is a perspective view of a resin panel for the door trim and a door pocket in a still further embodiment of the invention.
Figure 14:
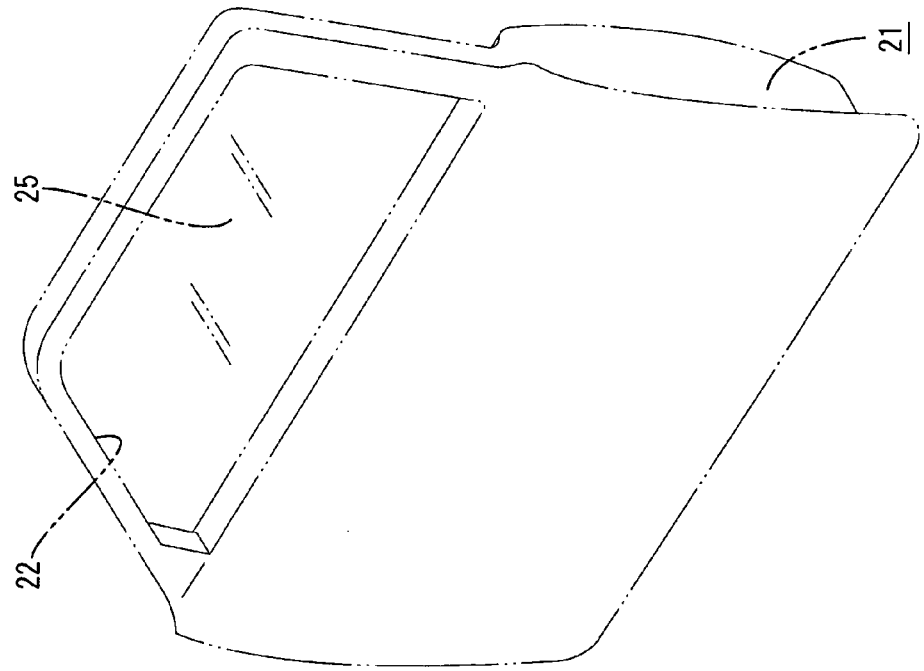
Figure 15A:
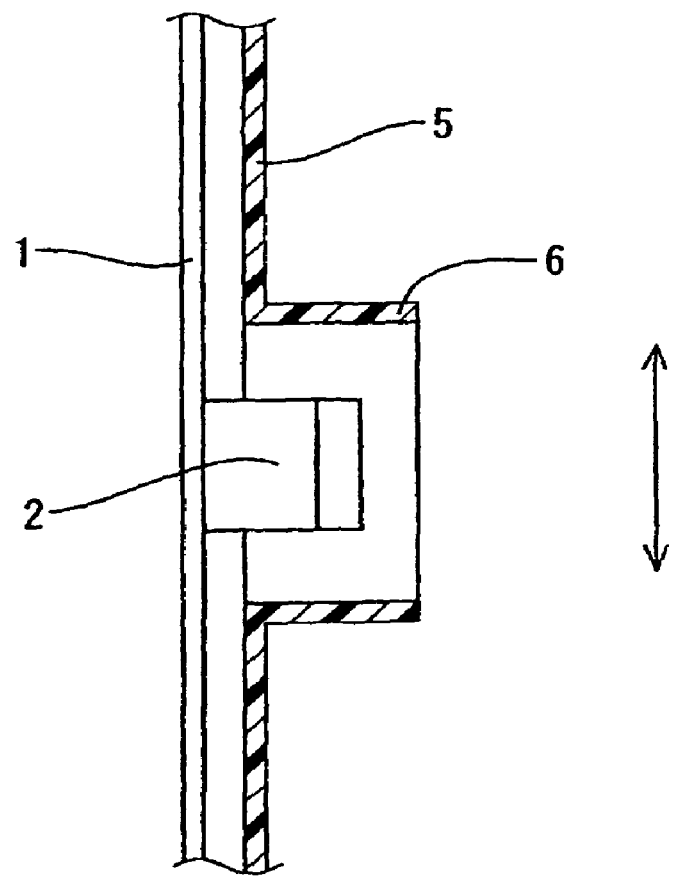
FIGS. 15(A) and 15(b) are sectional views of a conventional coupling structure.
Figure 15B:
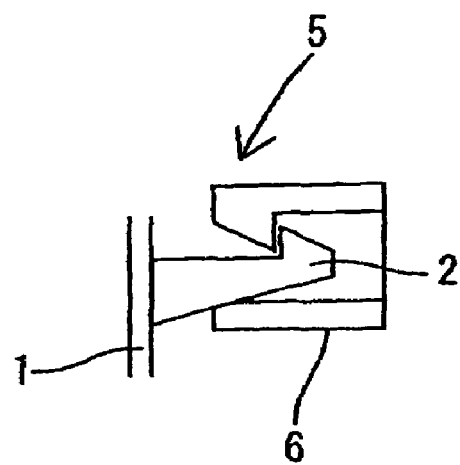

The resin panel 50 is used for attachment of a component such as a cup holder and is held on the door trim 30 in the foregoing embodiment. However, construction of the connecting members (30, 50) may be applied to any pair or more of members holding other members such that the other members are prevented from falling or vibrating relative to one another. For example, a resin panel 70 for a door pocket may be attached to an inside of the door trim 30 as shown in FIG. 14.

In the foregoing embodiment, the guide face 46 is provided on the lock claw 43 to avoid interference of the lock claw with arm forming die 65 when a product is removed from the die. However, when more importance is given to reliability of a locking feature against receiving portion 51, a steeper face may be provided instead of a slope shown in the guide face 46. In this case, the arm forming die 65 should be slidable in a direction perpendicular to the die-opening direction.

The lock holes 52 may be provided at the door trim 30 side, whereas the lock arms 41 may be formed at the resin door panel 50 side.

The lock arms 41 may be hollow so that the lock arm 41 side is flexed during assembly of the door trim 30 and resin panel 50, for example. Both the lock arms 41 and the receiving portions 51 may be flexed. Furthermore, the lock arm 41 may be deformed or both the lock arm 41 and the receiving portion 51 may be deformed. Furthermore, the ribs 45 may be provided on the side of the receiving portion 51. Additionally, the side of the receiving portion 51 may be formed with an inclined face serving to guide both the lock arm 41 and the receiving portion 51 during engagement between the two components.

The foregoing description and drawings are merely illustrative of principles of the present invention and are not to be construed in a limiting sense. Various changes and modifications will become apparent to those of ordinary skill in the art. All such changes and modifications are seen to fall within the scope of the invention as defined by the appended claims.

We claim:

1. A joint structure for joining a pair of connecting members to each other, in which the joint structure comprises:
   one of the pair of connecting members comprising a protruding lock portion; and
   another of the pair of connecting members comprising a receiving portion arranged and constructed to insertably receive said lock portion, said receiving portion including a first abutment edge opposing a second abutment edge,
   wherein said protruding lock portion includes at least one rib extending along an insertion direction of said lock portion into said receiving portion,
   wherein said at least one rib interferingly engages said first abutment edge of said receiving portion, thereby deforming said first abutment edge,
   wherein said first abutment edge decreases in thickness toward said second abutment edge, and
   wherein one of said pair of connecting members is a trim of an automobile,
   wherein said lock portion is plate shaped,
   wherein said at least one rib is formed on one side surface of said lock portion,
   wherein a lock claw is provided on another side surface of said lock portion, opposite to said one side surface containing said at least one rib, and
   wherein a surface of said lock claw opposes a surface of said receiving portion in a removal direction.

2. The joint structure according to claim 1,
   wherein said receiving portion includes a lock hole having an opening height R,
   wherein said lock portion includes an underside arm piece and a distance between the underside of said arm piece and the end face of said at least one rib, is a height H, with H being greater than R.

3. The joint structure according to claim 1,
   wherein at least one of said lock portion and said receiving portion comprises an inclined guiding surface inclined in the insertion direction for slidingly engaging the other of said at least one of said lock portion and receiving portion, and
   wherein said inclined guiding surface facilitates assembly of the joint structure.

4. The joint structure according to claim 1, wherein the connecting members have two or more pairs of the lock portions and the receiving portions and an orientation of engagement of at least one pair of the lock portions and the receiving portions differs from an orientation of engagement of another pair of the lock portions and the receiving portions.

5. A joint structure for joining two components together, wherein the joint structure comprises:
   a protruding lock portion extending from one component and including at least one rib located on and extending substantially perpendicularly from a first surface of said protruding lock portion; and a receiving portion located in another component and comprising a receiving hole including a proximate opening and a distal opening, with said proximate opening being larger than said distal opening, and with said distal opening comprising a first abutment edge and a second abutment edge positioned opposite one another across said distal opening, wherein said at least one rib extends along an insertion direction of said protruding lock portion into said receiving portion from said proximate opening through said distal opening, wherein said receiving portion includes a lock hole having an opening height R, wherein said lock portion includes an arm piece, and a distance between the underside of said arm piece and the end face of said at least one rib is a height H, with H being greater than R, wherein at least a portion of said first abutment edge is deformed due to said at least one rib interferingly engaging with said first abutment edge, wherein one of said protruding lock portion and said receiving portion forms part of a trim of an automobile, wherein said protruding lock portion includes a lock claw located on a distal end of said protruding lock portion opposite said second abutment edge, and wherein a surface of said lock claw opposes an end surface of said receiving hole in a direction opposite to the insertion direction.

6. The joint structure according to claim 5, wherein at least one of said lock portion and said receiving portion comprises an inclined guiding surface inclined in the insertion direction for slidingly engaging the other of said at least one of said lock portion and receiving portion, and wherein said inclined guiding surface facilitates assembly of the joint structure.

7. A joint structure for joining a pair of panels to each other, in which the joint structure comprises:

a protruding lock portion extending in an insertion direction from one of the pair of panels, with said protruding lock portion comprising
  (i) a lock claw proximate a distal end of said protruding lock portion, and
  (ii) two or more ribs separated from said lock claw by a portion of said protruding lock portion;

a receiving portion located in another of the pair of panels and comprising an opening arranged and constructed to interferingly receive said protruding lock portion, said opening having a first abutment edge and a second abutment edge opposing said first abutment edge across said opening, wherein said two or more ribs extend along the insertion direction of said protruding lock portion into said receiving portion, wherein said two or more ribs interferingly engage with said first abutment edge of said receiving portion, and said first abutment edge decreases in thickness toward said second abutment edge, wherein said two or more ribs deform said first abutment edge of said receiving portion, wherein a surface of said lock claw opposes a surface of said receiving portion in a direction opposite to the insertion direction, and wherein one of said protruding lock portion and said receiving portion forms part of a trim of an automobile.

8. A joint structure for joining two panels together, wherein the joint structure comprises:

a protruding lock portion extending from one panel and comprising
  (i) a lock claw located on a first surface on a distal end of said protruding lock portion, and
  (ii) two or more ribs located on a second surface of said protruding lock portion; and a receiving portion located in another panel and comprising a receiving hole including a proximate opening and a distal opening, with said distal opening being smaller than said proximate opening, with said distal opening being arranged and constructed to interferingly receive said protruding lock portion, and with said distal opening further including a first abutment edge and a second abutment edge positioned opposite to one another across said distal opening, said first abutment edge positioned to receive said two or more ribs and decreasing in thickness toward said second abutment edge, wherein said receiving portion includes a lock hole having an opening height R, wherein said lock portion includes an arm piece, and a distance between the underside of said arm piece and the end face of said two or more ribs is a height H, with H being greater than R, wherein said second surface of said protruding lock portion directly opposes said first abutment edge of said receiving portion, wherein said two or more ribs deform said first abutment edge of said receiving portion, wherein a surface of said lock claw opposes an end surface of said receiving hole in a direction opposite to the insertion direction, and wherein one of said one panel and said another panel is a trim of an automobile.

* * * * *